United States Patent
Huang et al.

(10) Patent No.: US 6,763,757 B2
(45) Date of Patent: Jul. 20, 2004

(54) PROCESS FOR MANUFACTURING A ONE-PIECE COOLING-CHANNEL PISTON

(75) Inventors: Yuejun Huang, Neckarsulm (DE); Hartmut Kamp, Heilbronn (DE); Volker Gniesmer, Alfeld (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 99 days.

(21) Appl. No.: 10/091,850

(22) Filed: Mar. 6, 2002

(65) Prior Publication Data

US 2002/0124401 A1 Sep. 12, 2002

(51) Int. Cl.⁷ ................................................ F01B 31/02
(52) U.S. Cl. ........................ 92/186; 92/222; 29/888.04
(58) Field of Search ................ 92/186, 222; 29/888.04, 29/888.042, 888.043, 888.044

(56) References Cited

U.S. PATENT DOCUMENTS

| 4,838,149 A | * | 6/1989 | Donnison et al. | 92/222 |
| 4,986,167 A | * | 1/1991 | Stratton et al. | 92/186 |
| 5,052,280 A | * | 10/1991 | Kopf et al. | 92/186 |
| 5,261,363 A | * | 11/1993 | Kemnitz | 29/888.044 |

FOREIGN PATENT DOCUMENTS

| DE | 3643039 | 6/1988 |
| DE | 4134528 | 5/1992 |
| DE | 4446726 | 6/1996 |

\* cited by examiner

*Primary Examiner*—Edward K. Look
*Assistant Examiner*—Igor Kershteyn
(74) *Attorney, Agent, or Firm*—Young & Basile, PC

(57) ABSTRACT

The invention relates to a process for manufacturing a single-piece cooling channel piston, where a piston blank produced by forging is furnished with a circumferential ring-shaped recess between the piston skirts and the piston crown and with an open-bottomed cooling channel in the area of a piston ring belt, where to increase the surface guidance area of the piston skirts it is envisioned that a component extending this piston ring belt is welded on below the piston ring belt.

7 Claims, 4 Drawing Sheets

PROCESS FOR MANUFACTURING A ONE-PIECE COOLING-CHANNEL PISTON

BACKGROUND

The invention relates to a process for manufacturing a one-piece cooling-channel piston and a piston in accordance with the primary claim of the independent patent claims.

From DE 44 46 7216 A 1 a process is known for manufacturing a one-piece cooling channel piston, in which a piston blank is produced by forging and an ring-shaped recess is introduced between a piston crown and the attached piston skirts by machining. Then an open-bottomed cooling channel is created in the piston crown by machining. After this, the wrist pin bores are created and the outside contour of the piston is machine finished. Following these steps the cooling channel, which is still open to the bottom, is closed by a cover ring so that the cooling medium circulating in the cooling channel (specifically engine oil) remains in the cooling channel to cool the piston crown.

As part of this process for manufacturing the cooling channel piston it is necessary that the axial height of the ring-shaped recess be at least equivalent to the axial height of the cooling channel. Because of the gap between the piston skirts and the piston crown (also called the piston top), undesirable instability results during operation of the cooling channel piston, the consequence of which is that the guidance of the cooling channel piston within the cylinder is inadequate.

The object of the invention is therefore to propose a process for manufacturing a one-piece cooling channel piston and a piston by which the said disadvantages are eliminated.

SUMMARY

Under the invention it is envisioned that a component is welded on below the piston ring belt, extending the piston ring belt. This component supplements the guidance surface area, where the entire guidance surface area now consists of the surfaces of the component and also of the piston skirts. The guidance surface area is increased overall, so that instability in the cooling channel piston is eliminated, since the component contributes to rigidity, and the operating characteristics of the cooling channel piston inside the cylinder are considerably improved. The geometric dimensions of the component, specifically the axial extent between the piston crown (piston top, specifically the lower edge of the piston ring belt) and the upper edge of the piston skirt are determined by the design constraints, where the component can extend over any axial length whatever between the two edges, and it is also conceivable that the lower edge of the component extends as far as the upper edge of the piston skirt or even seats against it.

To further increase stability it is even conceivable that the lower edge of the component is also welded to the upper edge of the piston skirt.

In a further development of the invention, the component has an inward facing flange, which extends at least over a partial area of the open-bottomed cooling channel. The forces impinging on the surface guidance area of the component are absorbed by this inward facing flange so that stability is thereby further increased. A side effect of this inward facing flange can be seen in the fact that the open-bottomed cooling channel is at least partially closed so that the available cooling medium collects in the cooling channel and contributes to the cooling of the piston crown. With this arrangement, the inward facing flange can cover the open-bottomed cooling channel completely, thereby creating a closed cooling channel. As an alternative, the inward facing flange can only partially cover the open-bottomed cooling channel so that the cooling channel remains at least partially open at the bottom. This has the advantage that cooling medium can continue to flow into and out of the cooling channel through the open areas.

In a further development of the invention, the downstanding flange of the component (in the direction of the upper edge of the piston skirt) and the inward facing flange are positioned at an angle, specifically at an approximate right angle, to each other. This means that the component with its flange is manufactured in such a way that the latter are positioned approximately at right angles to each other. This component can, for example, be manufactured by casting, although other manufacturing methods are also conceivable. For example, both flanges can be manufactured as stamped or formed components and then welded together.

In a further development of the invention, the flanges are either of the same thickness or are of different thicknesses. The thicknesses to be employed are determined specifically by the load on the component, that is, in order to produce the desired stability, the flanges must be sized in such a way that they are able to absorb and dissipate the forces that are generated.

In a further development of the invention, the component is located at least in the area above the piston skirt. Since the piston skirts have so far assumed the task of guiding the cooling channel piston and the component is intended to increase the surface guidance area, it is advantageously located above the piston skirt, viewed in the direction of motion of the cooling channel piston. This means that the component extends in the area between the lower edge of the piston ring belt and the upper edge of the piston skirt and at least within the area between the longitudinal edge of the piston skirt (viewed in the direction of motion of the piston), where it is also conceivable that the component projects beyond the longitudinal edges of the piston skirt.

In a further development of the invention, the component consists of at least two halves which are held in position in the area of the ring-shaped recess and are welded below the piston ring belt, as part of which the abutting portions specifically are welded together. The result is a component that is rigidly attached to the cooling channel piston, which increases the surface guidance area and can absorb the forces introduced there. The inward facing flanges can, as also in the case of the previously described embodiments, seat against the body of the cooling channel piston, although this is not absolutely necessary, so that an opening can remain between the circumferential edge of the inward facing flange and the body of the cooling channel piston. Manufacturing the component from at least two halves has the advantage that after the circumferential ring-shaped recess and the cooling channel have been introduced, they can be placed around the cooling channel piston in the area of the recess so that the welding procedure can then be carried out to join the component to the piston ring belt.

Various embodiments of cooling channel pistons manufactured in accordance with the claimed process or in accordance with another process are described below and using the drawing.

BRIEF DESCRIPTION OF THE DRAWING

Various embodiments of the component which increases the surface guidance area are shown in FIGS. 1 to 4, some in sectional view, some in an isometric view.

DETAILED DESCRIPTION

Figure 1:
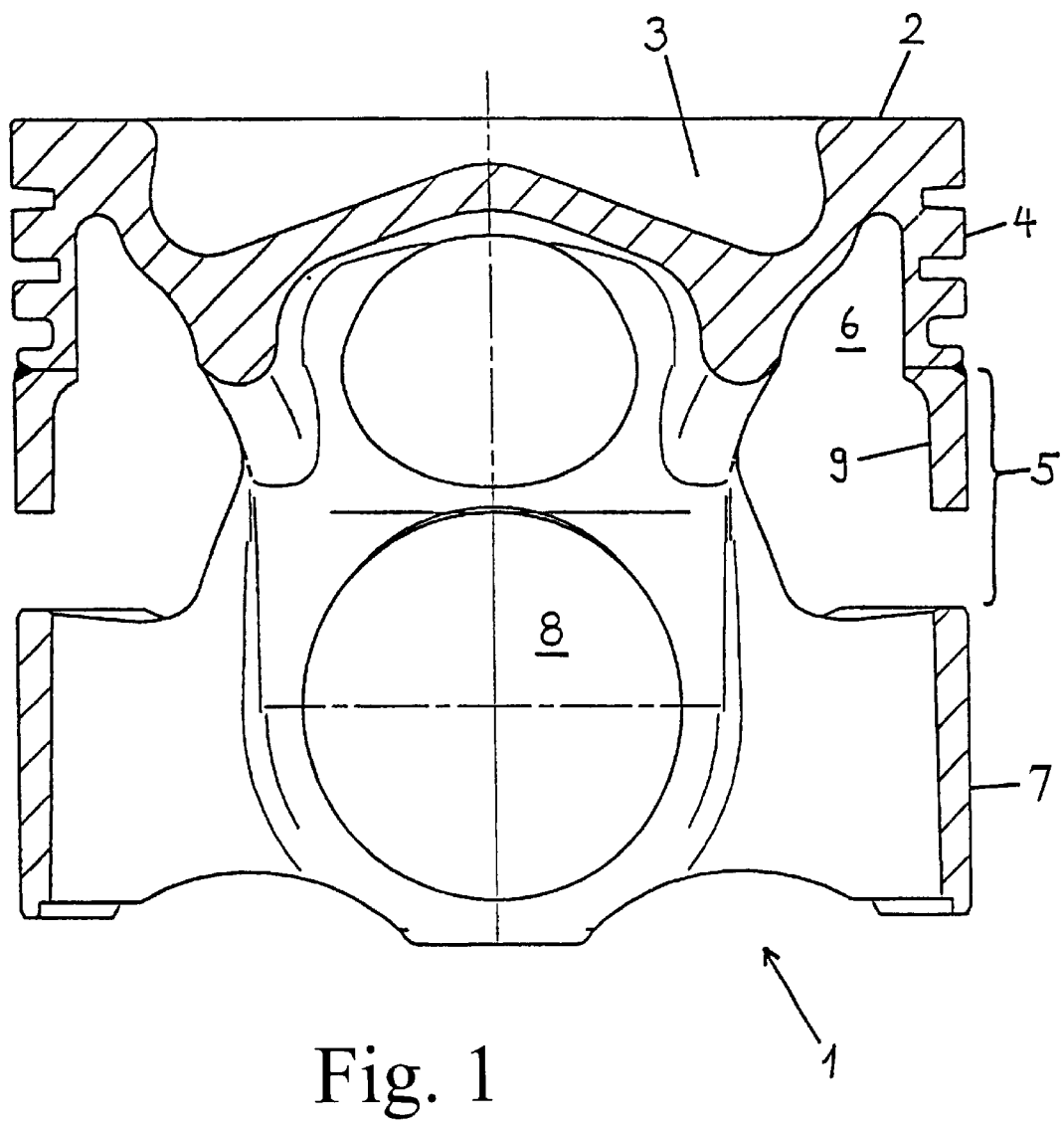

FIG. 1 shows a cooling channel piston 1, for which a piston blank (not shown) is first produced by forging. After this piston blank has been produced, a piston crown 2 (also called piston head) can be furnished, or is furnished, with a bowl-in-piston combustion chamber 3. Further, circumferential grooves are introduced into a piston ring belt 4 which accommodate the piston rings. In the same manner, the piston blank is machined to the effect that a ring-shaped circumferential recess 5 and a open-bottomed cooling channel 6 are created in the piston blank. This can be carried out, for example, by machining to remove the metal. The piston blank also has piston skirts 7, and after the piston blank is manufactured it is furnished with wrist pin bores.

To increase the guidance surface area, which is initially constrained by the surface of the piston skirts 7, a component 9 is welded to the lower edge of the piston ring belt 4, where the component 9 extends in the direction of the piston skirts 7. The component 9 has approximately the same radial extension as the piston skirt 7, where this radial extension can be less than, the same as or greater than the radial extension of the piston skirt 7. The axial extension of the component 9 can also vary from just below the lower edge of the piston ring belt 4 as far as the upper edge of the piston skirt 7.

Figure 2:
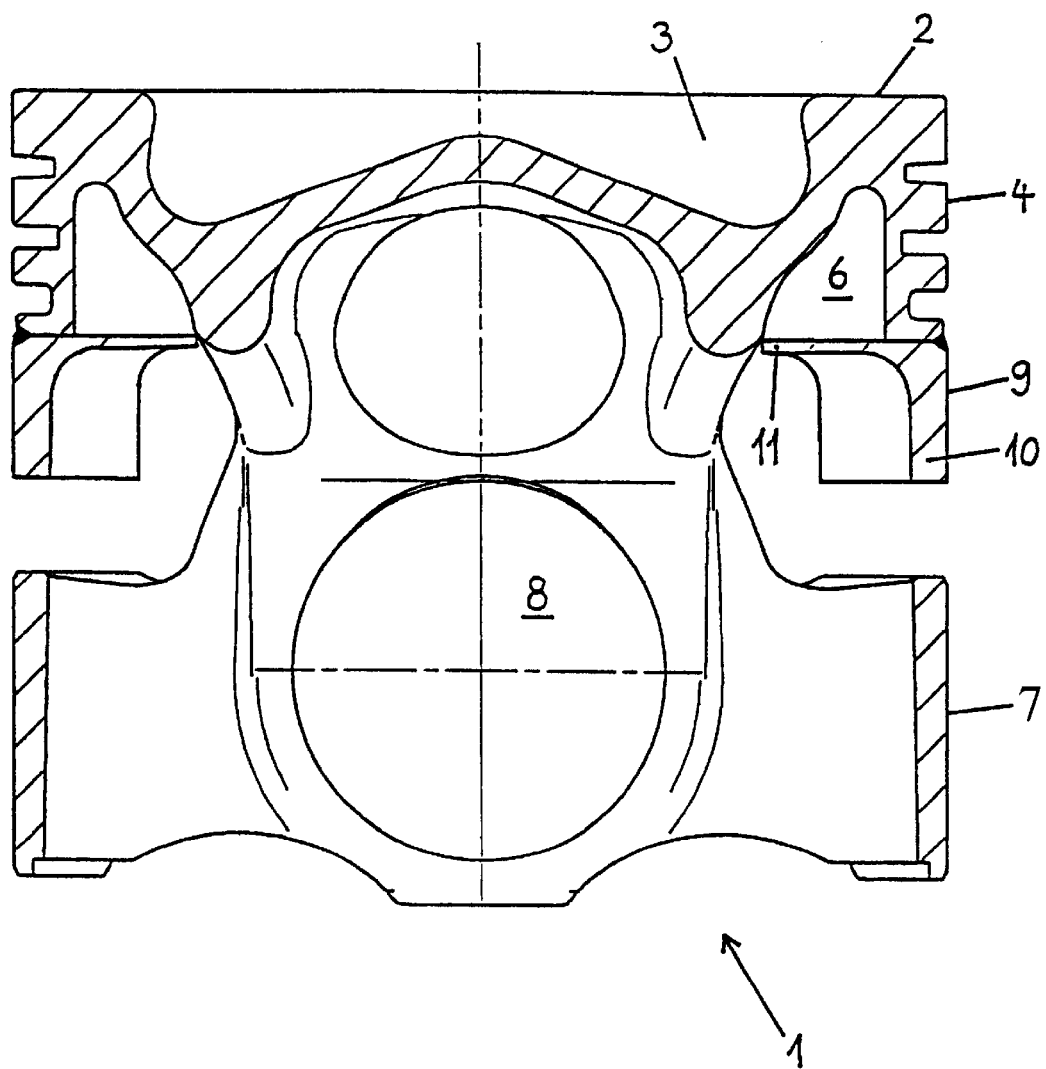

FIG. 2 shows that the component 9 has an inward facing (in the direction of the body of the cooling channel piston) flange 11 in addition to a downstanding flange 10, where both flanges 10 and 11 can be the same thickness or different thicknesses. Preferably the thickness of the downstanding flange 10 is greater than the thickness of the inward facing flange 11 since these geometric proportions provide optimal assurance that the loads impinging on the surface of the downstanding flange 10 can be absorbed through the inward facing flange 11 for the lowest possible weight of component 9. The inward facing flange 11 can abut the body of the cooling channel piston 1 (specifically to seal the cooling channel 6). This will not be necessary in the preferred embodiment as the loads impinging on the flange 10 can be absorbed by a "free floating" (not abutting the main body of the cooling channel piston 1) flange 11. In addition, a clearance between the body of the cooling channel piston 1 and the inward facing flange 11 has the advantage that cooling medium can pass into and out of the cooling channel 6.

Figure 3:
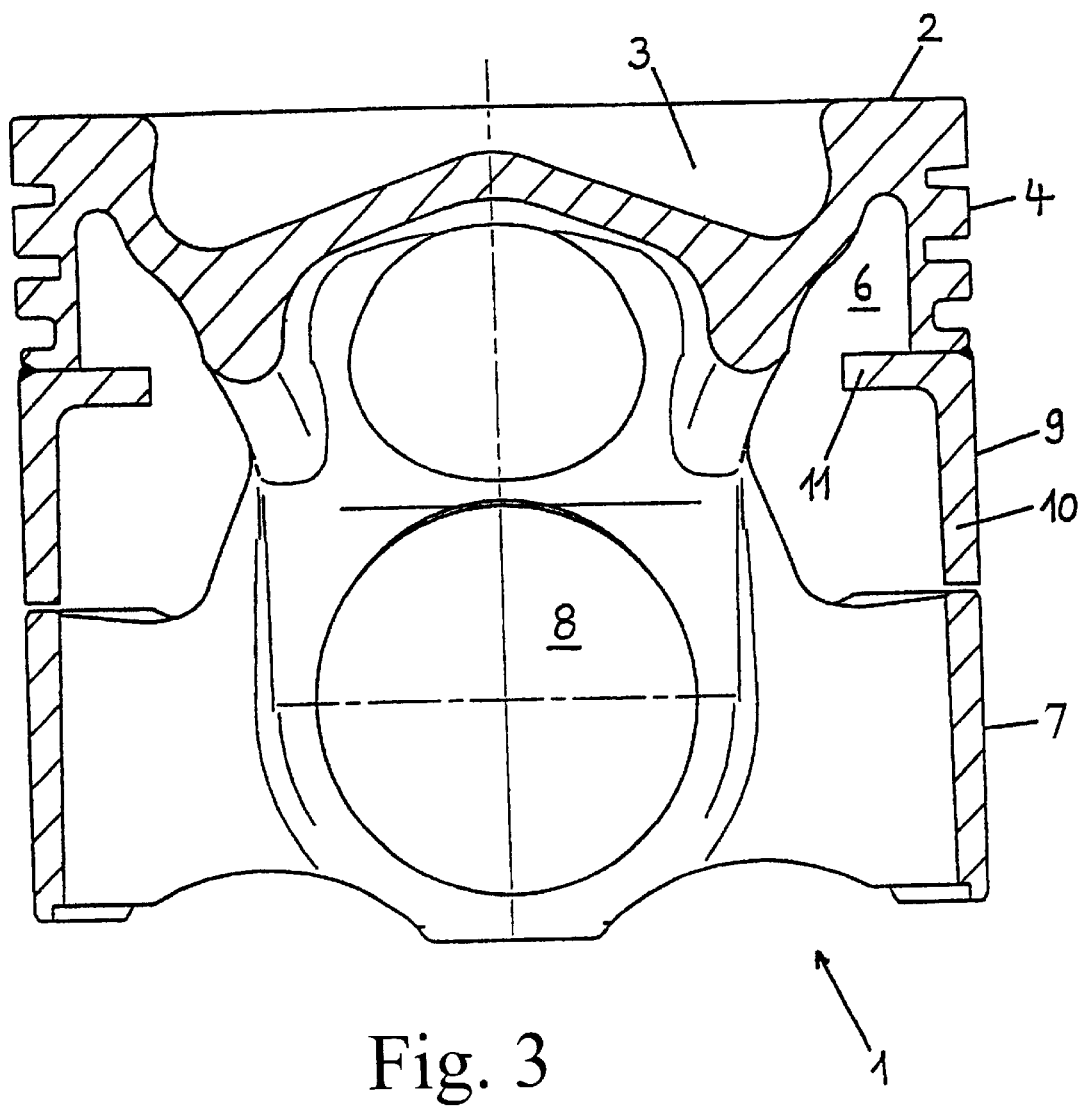

FIG. 3 shows an embodiment of the component 9 in which the two flanges have approximately the same thickness, where the abutting area of the two flanges positioned at approximately right angles to each other is reinforced by a radiused fillet. It can also be clearly seen that the inward facing flange 11 does not extend right up to the body of the cooling channel piston and secondly that the downstanding flange 10 extends approximately as far as the upper edge of the piston skirt 7.

Figure 4:
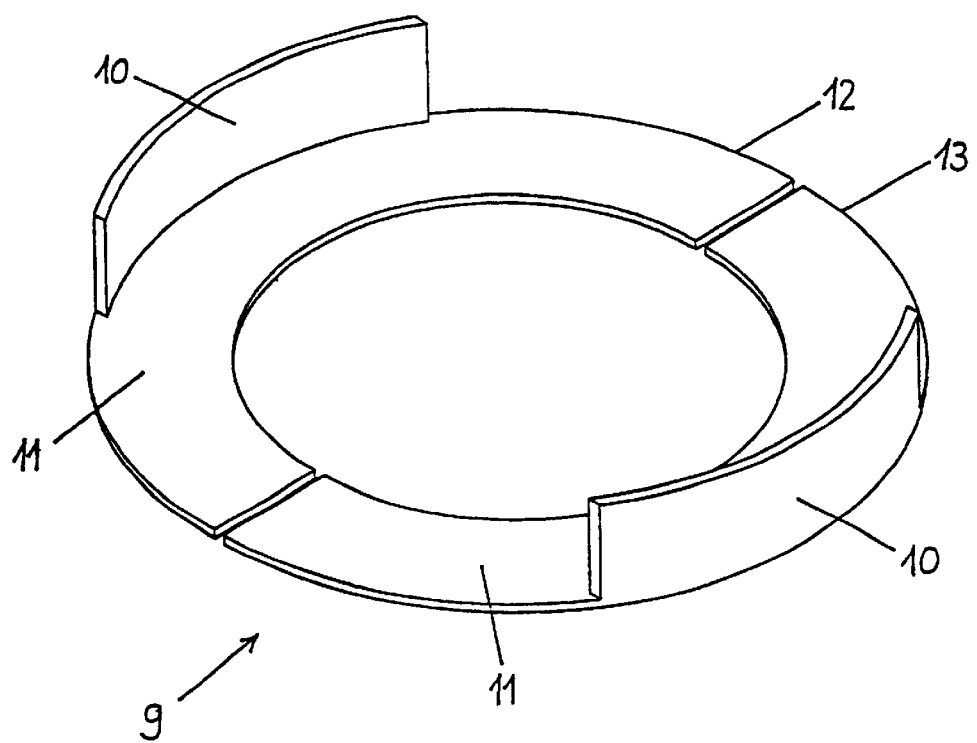

Finally, FIG. 4 shows that the component 9 consists of at least two halves 12 and 13, so that these two halves 12 and 13 can be placed around the body of the cooling channel piston 1 and fixed in place in the area of the ring-shaped recess 5 (see FIG. 1), so that the upper edge of the flange 10 can afterwards be welded to the lower edge of the piston ring belt 4. Then the two halves 12 and 13 are welded together at their abutting points to increase stability. After the component 9 has been welded to the cooling channel piston 1, the weld points are remachined.

What is claimed is:

1. A process for manufacturing a unitary cooling channel piston, comprising the steps of forging a piston blank having piston skirts coupled to a piston crown, in which a circumferential ring-shaped recess is introduced between the piston crown and the piston skirts attached to the piston crown, above the recess approximately at the height of a piston ring belt forming an open-bottomed cooling channel and, welding a component on below the piston ring extending the piston ring belt.

2. The process in accordance with claim 1, comprising the steps of positioning a downstanding flange of the component and an inward facing flange at an angle to each other.

3. The process in accordance with claim 2, further comprising the step of providing the component with an inward facing flange which extends at least over a partial section of the open-bottomed cooling channel.

4. The process in accordance with claim 1 further comprising the step of locating the component at least in the area above the piston skirt.

5. The process in accordance with claim 1 further comprising the step of providing the component with at least two halves which are fixed in position and welded on in the area of the ring-shaped recess and below the piston ring belt, wherein specifically the abutting points are welded together.

6. A process for manufacturing a unitary cooling channel piston, comprising the steps of forging a piston blank having piston skirts coupled to a piston crown, in which a circumferential ring-shaped recess is introduced between the piston crown and the piston skirts attached to the piston crown, and above the recess approximately at the height of a piston ring belt forming an open-bottomed cooling channel, welding a component on below the piston ring, extending a piston ring belt, and positioning a downstanding flange of the component and an inward facing flange at an angle to each other, and providing the flanges with similar thicknesses relative to each other.

7. A cooling channel piston in which a circumferential ring-shaped recess is introduced between a piston crown and piston skirts attached to the piston crown and an open-bottomed cooling channel is introduced above the recess approximately at the height of a piston ring belt, so that, a component unitarily affixed to and extending at least in part an outer surface of the piston ring belt is located below the piston ring belt.

* * * * *